Feb. 16, 1926.
S. HEATH
1,573,000
PROPELLER BLADE MOUNTING
Filed July 20, 1921
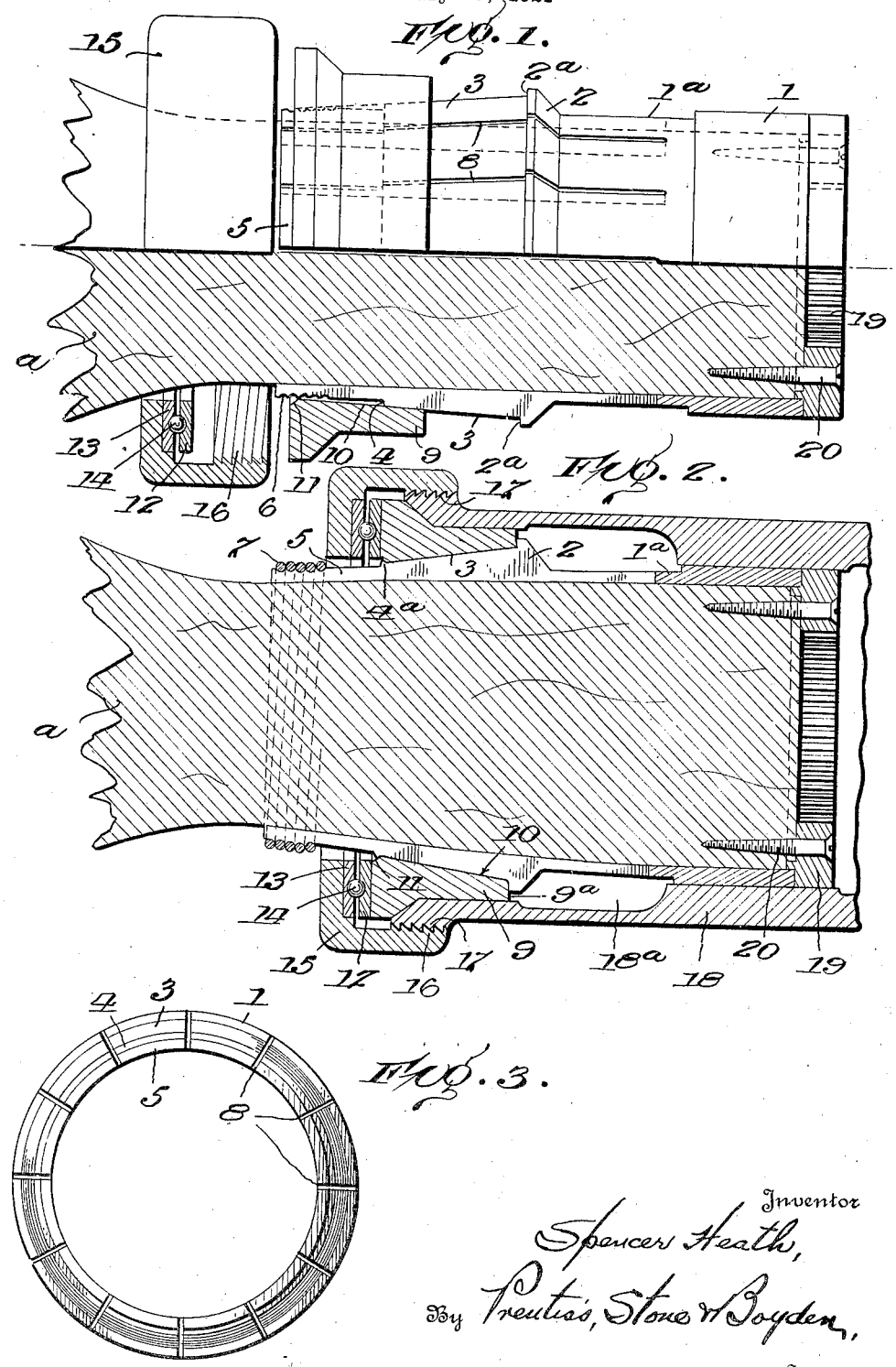
Inventor
Spencer Heath,
By Prentiss, Stone & Boyden,
Attorneys Patented Feb. 16, 1926.

1,573,000

UNITED STATES PATENT OFFICE.

SPENCER HEATH, OF BALTIMORE, MARYLAND.

PROPELLER-BLADE MOUNTING.

Application filed July 20, 1921. Serial No. 486,206.

*To all whom it may concern:*

Be it known that I, SPENCER HEATH, a citizen of the United States, residing at Baltimore, State of Maryland, have invented certain new and useful Improvements in Propeller-Blade Mountings, of which the following is a specification.

This invention relates to airplane propellers and more particularly to propellers of that type in which the blades may be angularly adjusted by rotation on their own axes. The objects of the present invention, are to provide an improved, simple and effective method of securing the shank of a propeller blade in a suitable ferrule or socket, and an improved method of mounting such a ferrule or socket in the propeller hub.

In order that the invention may be readily understood, reference is had to the accompanying drawing forming part of this specification, and in which:—

Fig. 1 is a view partly in longitudinal section and partly in side elevation of my improved ferrule and securing means, and propeller blade shank being shown as fitted therein and the parts being illustrated in their separated condition.

Fig. 2 is a longitudinal section through the ferrule and shank, also illustrating a portion of the propeller hub, and showing the parts in their assembled relation, and Fig. 3 is an end view of the ferrule itself.

Referring to the drawings in detail, my improved ferrule or socket, which is substantially cylindrical in form, comprises a relatively thick end portion 1, and an ajacent portion $1^a$ of reduced diameter. Adjacent the portion $1^a$ is a flaring portion 2, on the other side of which is a gently tapering portion 3, separated from the portion 2 by means of a shoulder $2^a$. Beyond the tapered portion 3 is an end portion 5 of somewhat reduced diameter, around which is preferably formed a spiral groove 6 for a purpose hereinafter described.

The entire ferrule is provided with a plurality of longitudinally disposed slits or slots 8 extending through the portions 5, 3, 2 and well into the portion $1^a$; these slits or slots forming between them a plurality of spaced, yieldable tongues or members, resembling a spring chuck.

Surrounding the outer end of the ferrule is a ring 9 having a tapered inner surface 10 shaped to co-act with the tapered surface 3 of the ferrule, and the extreme inner edge of this ring adjacent the outer end thereof is preferably slightly beveled off as indicated at 11, for a purpose hereinafter described.

The entire ferrule and blade shank is adapted to rotatably fit within a hub 18 having threads 17 at its outer end with which co-operate similar threads 16 on a retaining ring 15 loosely surrounding the ferrule.

The middle portion of the hub socket is relieved as indicated at $18^a$, while the outer and inner portions are bored to two cylindrical surfaces, to receive the portion 1 of the ferrule and the outer surface of the ring 9, said ring and portion 1 of the ferrule constituting the bearings on which the blade turns.

At the extreme inner end of the ferrule is located an annular gear 19 secured to the blade shank by means of screws 20, such gear co-operating with suitable pinions by means of which the blade is angularly adjusted on its own axis, as shown, for example, in my prior application, Serial No. 308,112, filed July 2, 1919.

The method of assembling the parts of my improved propeller mounting will now be described. Over the blade shank, which is usually of wood, is first slipped the retaining ring 15 and its associated thrust bearings 12, 13 and 14, and also the clamping ring 9. The end of the shank is then inserted into the improved ferrule with a snug fit. The clamping ring is then forced longitudinally of the ferrule, as by driving, and the tapered surface 10 thereof is caused to ride upon the tapered surface 3 of the ferrule, thus drawing together or contracting the resilient spaced members or tongues formed between the slots 8. When completely driven home, the ring 9 occupies the position shown in Fig. 2 with its inner end $9^a$ abutting the shoulder $2^a$. In order to hold the ring in this position and prevent its slipping off, I preferably form a slight shoulder 4 at the outer end of the tapered portion 3 of the ferrule, and upset this shoulder so as to cause the metal to engage the beveled off edge 11 at the outer end of the ring. This is indicated at $4^a$ in Fig. 2.

The thrust bearing hereinbefore referred to, comprises the concentric annular runways 12 and 13, between which are disposed a series of balls 14, and it will be noted that in the assembled position of the parts, this thrust bearing is interposed between the outer end of the ring 9 and the retaining ring 15, the square shouldered threads 16 and 17 serving to resist the thrust.

It will be noted that when the ring 9 has been driven home as indicated in Fig. 2, the yieldable members or tongues have been squeezed together so that the outer end of the ferrule has been substantially reduced in diameter, thus causing the ferrule to bite into and compress the wooden blade shank. It will be observed that this compression and gripping of the shank is at a point well removed from the extreme end thereof, and in this way an exceptionally strong hold on the shank is obtained.

After the ferrule has been compressed or contracted as described, I may still further strengthen it by winding, under high tension, a suitable wire 7 around the extreme outer end of the ferrule in the groove 6, as shown in Fig. 2. After a suitable number of turns of this wire have been wound on, the entire band is securely soldered.

What I claim is:—

1. The combination with a propeller blade shank, of a ferrule in which said shank is fitted, said ferrule comprising a plurality of longitudinally disposed spaced yieldable portions having tapering outer surfaces, a tapered ring surrounding said surfaces, whereby, when said ring is driven longitudinally of the ferrule, said spaced yieldable portions are pressed together, and caused to tightly grip the shank, and means for preventing reverse movement of the ring after it has been driven up to its extreme position.

2. The combination with a propeller blade shank formed of compressible material, of a ferrule in which said shank is fitted, said ferrule having a plurality of parallel, spaced, yieldable portions, and a wire wound under high tension around the ends of said portions for squeezing them together, and causing them to bite into and compress the blade shank.

3. The combination with a blade shank and ferrule having a compressible portion in which said shank is enclosed, of a hub in which said ferrule is mounted for rotation, a ring surrounding said ferrule and having an outer surface snugly fitting within said hub and constituting a journal on which the ferrule turns, and means carried by said hub and engaging said ring for exerting a thrust against the ring longitudinally of the ferrule.

4. The combination with a blade shank, of a ferrule having a yieldable portion enclosing said shank, a clamping ring surrounding said yieldable portion of the ferrule and causing it to compress and grip the blade shank, and a hub socket in which said ferrule is rotatably mounted, the said ring snugly fitting said socket and constituting a bearing surface on which the ferrule turns.

5. The combination with a blade shank and ferrule in which it is enclosed, said ferrule having a compressible portion, a hub in which said ferrule is rotatably mounted, a clamping ring surrounding said ferrule, and movable longitudinally thereof to cause compression of the compressible portion thereof, a retaining ring surrounding the blade shank and adjustably secured to said hub, and a thrust bearing interposed between said clamping ring and retaining ring.

6. In a construction of the kind described, a ferrule having a compressible portion, a blade shank arranged in said ferrule, a hub in which said ferrule is rotatably mounted, a clamping ring for engaging said compressible portion of said ferrule and forcing the same into engagement with said shank, and a retaining ring adjustably mounted on said hub and serving to exert a thrust against said clamping ring.

7. In a construction of the kind described, a ferrule having a compressible portion, a blade shank arranged in said ferrule, a hub in which said ferrule is mounted, clamping means movable longitudinally of said ferrule for causing said compressible portion thereof to clamp said shank, and a retaining ring adjustably mounted on said hub for moving said clamping means longitudinally of said ferrule.

8. In a construction of the kind described, a propeller shank, a ferrule in which said shank is mounted, a clamping ring surrounding said ferrule, means for causing said ferrule to tightly clamp said shank when said clamping ring is moved longitudinally of said ferrule, a hub in which said ferrule is rotatably mounted, and means carried by said hub for exerting a thrust against said ring longitudinally of said ferrule.

In testimony whereof I affix my signature.

SPENCER HEATH.